(12) United States Patent
Myers

(10) Patent No.: US 7,497,423 B2
(45) Date of Patent: Mar. 3, 2009

(54) EXTENSIBLE END MEMBER FOR GAS SPRING ASSEMBLY

(75) Inventor: James Richard Myers, Indianapolis, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 0 days.

(21) Appl. No.: 11/654,328

(22) Filed: Jan. 17, 2007

(65) Prior Publication Data

US 2007/0114706 A1 May 24, 2007

(51) Int. Cl.
*F16F 9/04* (2006.01)
(52) U.S. Cl. .............. 267/64.27; 267/64.21; 267/64.23; 267/64.24
(58) Field of Classification Search .............. 267/64.27, 267/64.23, 64.24, 64.19, 64.21, 122
See application file for complete search history.

(56) References Cited

U.S. PATENT DOCUMENTS

| 894,117 | A | | 7/1908 | Clark | |
|---|---|---|---|---|---|
| 4,294,324 | A | | 10/1981 | Kimball et al. | |
| 4,398,704 | A | * | 8/1983 | Buchanan et al. | 267/64.21 |
| 4,718,650 | A | * | 1/1988 | Geno | 267/64.27 |
| 4,778,198 | A | * | 10/1988 | Gold | 280/124.147 |
| 4,817,922 | A | * | 4/1989 | Hovance | 267/64.21 |
| 4,844,429 | A | | 7/1989 | Ecktman | |
| 4,934,667 | A | | 6/1990 | Pees et al. | |
| 4,988,082 | A | * | 1/1991 | Pees | 267/64.24 |
| 5,326,082 | A | | 7/1994 | Ecktman et al. | |
| 5,342,139 | A | | 8/1994 | Hoffman | |
| 5,707,045 | A | * | 1/1998 | Easter | 267/64.21 |
| 5,725,066 | A | | 3/1998 | Beard et al. | |
| 6,386,523 | B1 | * | 5/2002 | Crabtree et al. | 267/64.21 |
| 6,386,524 | B1 | | 5/2002 | Levy et al. | |
| 6,402,128 | B1 | | 6/2002 | Trowbridge | |
| 6,513,798 | B2 | | 2/2003 | Capek et al. | |
| 6,651,995 | B1 | | 11/2003 | Buettner | |
| 6,814,346 | B2 | | 11/2004 | Müller et al. | |
| 6,905,113 | B2 | | 6/2005 | Bank et al. | |
| 7,104,547 | B2 | * | 9/2006 | Brookes et al. | 280/6.153 |

FOREIGN PATENT DOCUMENTS

| DE | 43 27 909 A1 | 3/1995 |
|---|---|---|
| DE | 298 13 031 U1 | 11/1998 |
| EP | 1 122 459 A | 8/2001 |
| WO | WO 03/051656 A | 6/2003 |

* cited by examiner

*Primary Examiner*—Robert A Siconolfi
*Assistant Examiner*—Mariano Sy
(74) *Attorney, Agent, or Firm*—Sarah M. Jabbari; Fay Sharpe LLP

(57) ABSTRACT

A piston assembly used in forming a gas spring assembly includes a first piston member and a second piston member telescopically engaging one another and capable of axial displacement relative to one another between collapsed and extended conditions. The first piston member includes a mounting end and the second piston member includes a flexible wall-engaging end. The first and second piston members arranged such that in the collapsed condition the mounting and flexible wall-engaging ends are disposed a first distance from one another and in the extended condition the mounting and flexible wall-engaging ends are disposed at a second distance from one another with the second distance being greater than the first distance. A gas spring assembly and suspension system utilizing such a piston assembly as well as a method are also included.

20 Claims, 5 Drawing Sheets

EXTENSIBLE END MEMBER FOR GAS SPRING ASSEMBLY

BACKGROUND

The subject matter of the present disclosure broadly relates to the art of gas spring suspension systems and, more particularly, an extensible end member for use in forming with a gas spring assembly as well as a method of using the same.

The subject matter of the present disclosure finds particular application and use in conjunction with suspension systems of wheeled vehicles, and will be shown and described herein with reference thereto. However, it is to be appreciated that the subject matter of the present disclosure is also amenable to other applications and environments, and that the specific uses shown and described herein are merely exemplary. For example, the subject matter of the present disclosure could be used in support structures, height adjusting systems and actuators associated with industrial machinery, components thereof and/or other such equipment. Accordingly, the subject matter of the present disclosure is not intended to be limited to use associated with vehicle suspensions.

The problems associated with overextending a gas spring assembly such that the flexible wall thereof is tensioned between the opposing end members are generally well known. Such problems can include the undesirable formation of leak paths and the degeneration of otherwise substantially fluid-tight sealing arrangements. In some circumstances, one or more components of the gas spring assembly can even become damages or otherwise adversely effected. Accordingly, various arrangements have been proposed to prevent the occurrence of such overextension or to at least minimize the impact that such an event has on the structure and performance of the gas spring assembly.

One example of such an arrangement is shown in U.S. Pat. No. 6,402,128 ('128), which discloses an air spring having an end member, a main piston spaced from the end member, and a flexible wall secured therebetween in a conventional arrangement. The '128 patent also describes a restraining piston that is telescopically received within the main piston. An end of the restraining piston extends outwardly beyond the main piston and is secured to the end member. While various features of the restraining piston in the '128 patent provide other functional aspects of the air spring, the restraining piston also acts as a positive stop to prevent the flexible wall of the air spring from being tensioned and, thus, possibly damaged or otherwise adversely effected due to the occurrence of an overextended condition.

One difficulty with the foregoing and other known constructions that act to limit the distance that the end members of the air spring can be separated from one another is that in such constructions the length of the restraining piston will likely need to be related to the operative length of the flexible wall. That is, if the length of the restraining piston is significantly greater than the fully extended length of the flexible wall, the restraining piston could be ineffective in protecting against overextension of the flexible wall. Oppositely, if the length of the restraining piston is significantly less than the fully extended length of the flexible wall, the air spring could be incapable extending through the full functional range of the flexible wall. To ensure that complimentary components are used and optimal performance is attained, it may be necessary to use different restraining pistons for each of the different length flexible wall. It should be recognized that such arrangements can lead to increased production, assembly and inventory costs as well as other associated issues.

Another disadvantage of the foregoing and other known arrangements that act to limit the distance that the end members of the air spring can be separated from one another is that such extension-limiting devices are often formed within the spring chamber of the air spring. This can reduce the active surface area of the air spring and result in reduced load capacity thereof. As such, an air spring having a larger size (i.e., diameter) may be necessary to support the expected load conditions of a given application. While in some applications the operating envelope for an air spring may be sufficient to accommodate this increased size, in many applications operating envelopes are continuing to be reduced. As a result, it is generally desirable to avoid such increases in size.

Therefore, it is believed desirable to develop a piston assembly and gas spring assembly utilizing the same that is capable of overcoming the foregoing and other problems and disadvantages.

BRIEF DESCRIPTION

One exemplary embodiment of a gas spring assembly is provided in accordance with the present novel concept that is capable of use between an associated sprung mass and an associated unsprung mass. The gas spring assembly includes an end member adapted for securement on one of the associated sprung and unsprung masses. A piston assembly is disposed in spaced relation to the end member such that an axis is defined therebetween. The piston assembly includes a first piston member and a second piston member that extensibly engage one another and are capable of generally axial displacement relative to one another between a collapsed condition and an extended condition. The first piston member includes a mounting end adapted for securement on the other of the associated sprung and unsprung masses. The second piston member includes a flexible wall-engaging portion. A flexible wall is secured between the end member and the piston assembly and at least partially defines a spring chamber therebetween. The flexible wall is secured on the flexible wall-engaging portion of the second piston member such that in the collapsed condition of the piston assembly, an end portion of the flexible wall that is secured on the second piston member is axially spaced a first distance from the mounting end of the first piston member. Additionally, in the extended condition of the piston assembly, the end portion of the flexible wall is axially spaced a second distance from the mounting end of the first piston member. The second distance being greater than the first distance.

One exemplary embodiment of a suspension system in accordance with the present novel concept is provided for use in supporting an associated sprung mass of an associated vehicle on an associated unsprung mass of the associated vehicle. The suspension system includes a plurality of gas spring assemblies that are secured between the associated sprung and unsprung masses of the vehicle. Each gas spring assembly of the plurality of gas spring assemblies has a longitudinally extending axis and includes an end member adapted for securement on one of the associated sprung and unsprung masses. Each gas spring assembly also includes a piston assembly axially spaced from the end member and a flexible wall secured between the end member and the piston assembly that at least partially defines a spring chamber therebetween. The piston assembly includes first and second piston members that interengage one another and are capable of axial displacement relative to one another between a collapsed condition and an extended condition. The first piston member includes a mounting end that is suitable for securement on the other of the associated sprung and unsprung masses. The second piston member includes a flexible wall-engaging portion along which an end portion of the flexible wall is received and secured. In the collapsed condition of the piston assembly, the end portion of the flexible wall is axially spaced a first distance from the mounting end of the first piston member. In the extended condition of the piston assembly, the end portion of the flexible wall is axially spaced a second distance from the mounting end of the first piston member with the second distance being greater than the first distance. A pressurized gas source is in communication with the plurality of gas spring assemblies. Additionally, a control device is operatively connected between the pressurized gas source and the plurality of gas spring assemblies. The control device is adapted to selectively permit pressurized gas flow therebetween. An electronic control unit is in communication with at least the control device and is capable of actuating the control device to selectively permit pressurized gas flow to and from the plurality of gas spring assemblies.

One exemplary embodiment of a gas spring piston assembly is provided in accordance with the present novel concept for use on an associated vehicle structure and adapted to receive an associated flexible spring wall of an associated gas spring assembly. The gas spring piston assembly includes a first piston member that includes a longitudinally extending central axis and a mounting end that is adapted for securement on the associated vehicle structure. A second piston member includes a spring wall-receiving portion that is suitable for receivingly engaging the associated flexible spring wall. The second piston member telescopically engages the first piston member and is displaceable relative thereto between a collapsed condition in which the spring wall-receiving portion of the second piston member is axially spaced a first distance from the mounting end of the first piston member and an extended condition in which the spring wall-receiving portion is axially spaced a second distance from the mounting end of the first piston member. The second distance being greater than the first distance such that the associated flexible spring wall is axially spaced a greater distance from the associated vehicle structure in the extended condition than in the collapsed condition.

One exemplary method of supporting a sprung mass of a vehicle on an unsprung mass of the vehicle is provided in accordance with the present novel concept that includes providing a gas spring assembly that has an axis. The gas spring assembly includes an end member, a piston assembly axially spaced from the end member, and a flexible wall extending between the end member and the piston assembly. The piston assembly includes first and second piston members that extensibly interengage one another and are capable of displacement between a collapsed condition and an extended condition. The first piston member includes a mounting end and the second piston member includes a flexible wall-engaging end with the flexible wall secured therealong. The method also includes securing the gas spring assembly between the sprung and unsprung masses of the vehicle such that the end member is operatively connected on one of the sprung and unsprung masses and such that the mounting end of the first piston member of the piston assembly is secured on the other of the sprung and unsprung masses. The method further includes displacing the sprung and unsprung masses in a first direction in which the sprung and unsprung masses move generally away from one another and thereby extend the piston assembly such that the flexible wall-engaging end of the second piston member is axially disposed at a first distance from the mounting end of the first piston member. The method also includes displacing the sprung and unsprung masses in a second direction in which the sprung and unsprung masses move generally toward one another and thereby collapse the piston assembly such that the flexible wall-engaging end of the second piston member is axially disposed at a second distance from the mounting end of the first piston member with the first distance being greater than the second distance.

DETAILED DESCRIPTION

Figure 1:
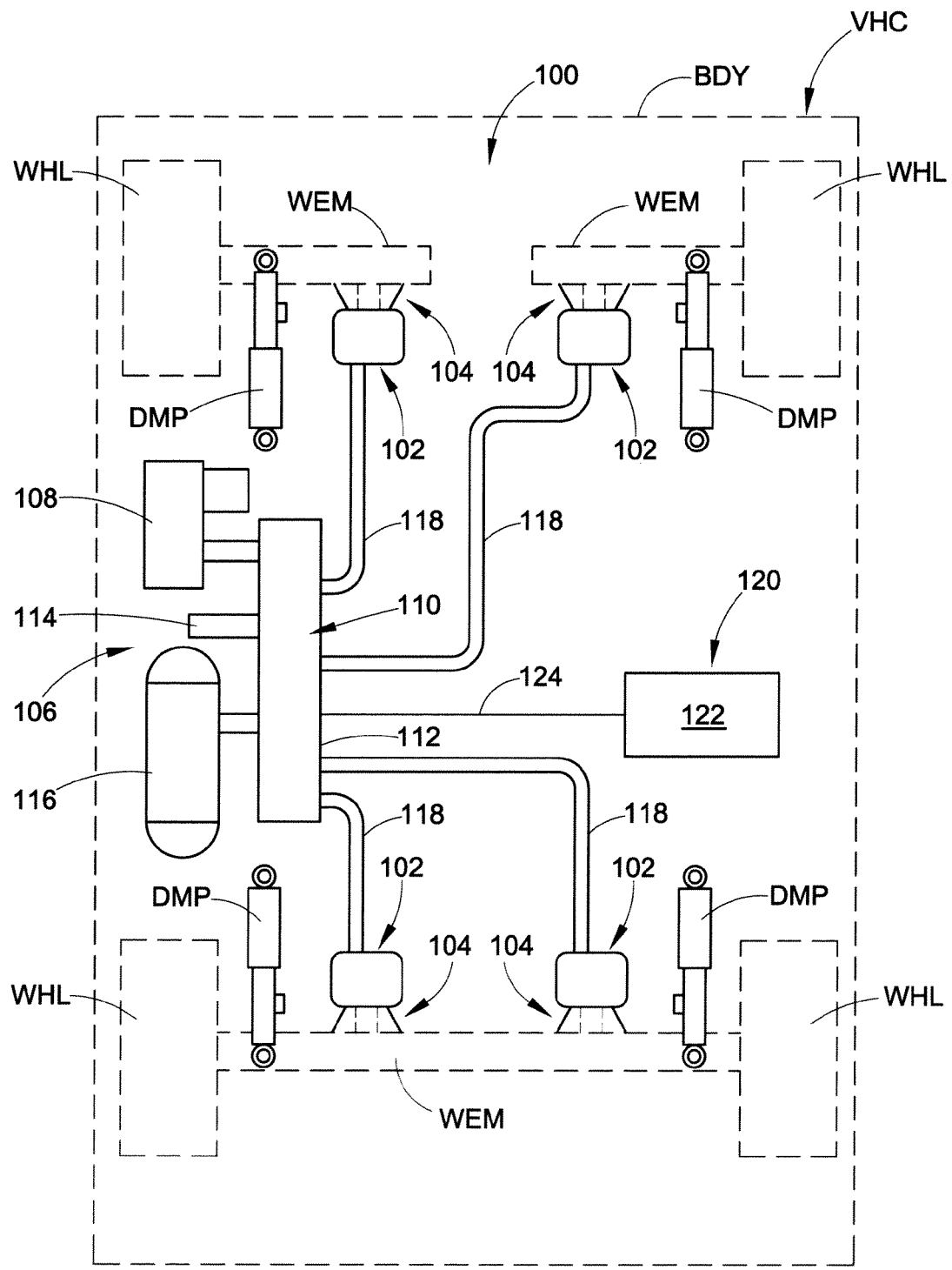
FIG. 1 is a schematic representation of one exemplary embodiment of a vehicle suspension system utilizing gas spring assemblies that include a piston assembly in accordance with the present novel concept.

Turning now to the drawings, wherein the showings are for the purpose of illustrating exemplary embodiments of the present novel concept and not for the purpose of limiting the same, FIG. 1 illustrates one embodiment of a suspension system 100 disposed between a sprung mass, such as an associated vehicle body BDY, for example, and an unsprung mass, such as an associated wheel WHL or an associated wheel-engaging member WEM, for example, of an associated vehicle VHC. It will be appreciated that any such suspension system can include any number of one or more systems, components and/or devices and that the same can be operatively connected between the sprung and unsprung masses of the associated vehicle in any suitable manner. For example, such a suspension system can include a plurality of damping members, such as dampers DMP, for example, that can be operatively connected between the sprung and unsprung masses of the associated vehicle in any suitable manner.

Such a suspension system also includes a plurality of gas spring assemblies that are supported between the sprung and unsprung masses of the associated vehicle. In the embodiment shown in FIG. 1, suspension system 100 includes four gas spring assemblies 102, one of which is disposed toward each corner of the associated vehicle adjacent a corresponding wheel WHL. However, it will be appreciated that any other suitable number of gas spring assemblies could alternately be used in any other suitable configuration or arrangement. As shown in FIG. 1, gas spring assemblies 102 are supported between wheel-engaging members WEM and body BDY of associated vehicle VHC. As will be discussed in greater detail hereinafter, gas spring assemblies 102 are shown as including piston assemblies 104 that can be secured on or along a structural component of the associated vehicle, such as wheel-engaging members WEM as shown in FIG. 1, for example. Additionally, it will be recognized that the gas spring assemblies shown and described herein (e.g., gas spring assemblies 102) are of a rolling lobe-type construction.

However, it will be appreciated that the present novel concept can be utilized in association with any other suitable gas spring assembly arrangements and/or construction.

Suspension system 100 also includes a pressurized gas supply system 106 that is operatively associated with the gas spring assemblies for selectively supplying pressurized gas (e.g., air) thereto and selectively transferring pressurized gas therefrom. In the exemplary embodiment shown in FIG. 1, gas supply system 106 includes a pressurized gas source, such as a compressor 108, for example, for generating pressurized air or other gases. The gas supply system can also include any number of one or more control devices of any suitable type, kind and/or construction as may be capable of effecting the selective transfer of pressurized gas. For example, a valve assembly 110 is shown as being in communication with compressor 108 and can be of any suitable configuration or arrangement. In the exemplary embodiment shown, valve assembly 110 includes a valve block 112 with a plurality of valves (not shown) supported thereon. Valve assembly 110 can also optionally include a suitable exhaust, such as a muffler 114, for example, for venting pressurized gas from the system. Optionally, pressurized gas supply system 106 can also include a reservoir 116 in fluid communication with valve assembly 110 and suitable for storing pressurized gas.

The one or more control devices, such as valve assembly 110, for example, can be in communication with gas spring assemblies 102 in any suitable manner, such as, for example, through suitable transmission lines 118. As such, pressurized gas can be selectively transmitted to and/or from the gas springs through valve assembly 110, such as to alter or maintain vehicle height at one or more corners of the vehicle, for example.

Suspension system 100 also includes a control system 120 that is capable of communication with any one or more other systems and/or components (not shown) of suspension system 100 and/or of which VHC for selective operation and control of the suspension system. Control system 120 includes a controller or electronic control unit (ECU) 122 in communication with compressor 108 and/or valve assembly 110, such as through a conductor or lead 124, for example, for selective operation and control thereof, including supplying and exhausting pressurized fluid to and from gas spring assemblies 102. Controller 122 can be of any suitable type, kind and/or configuration.

Control system 120 can also optionally include one or more height or distance sensing devices (not shown) as well as any other desired systems and/or components. Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves, for example.

Figure 2:
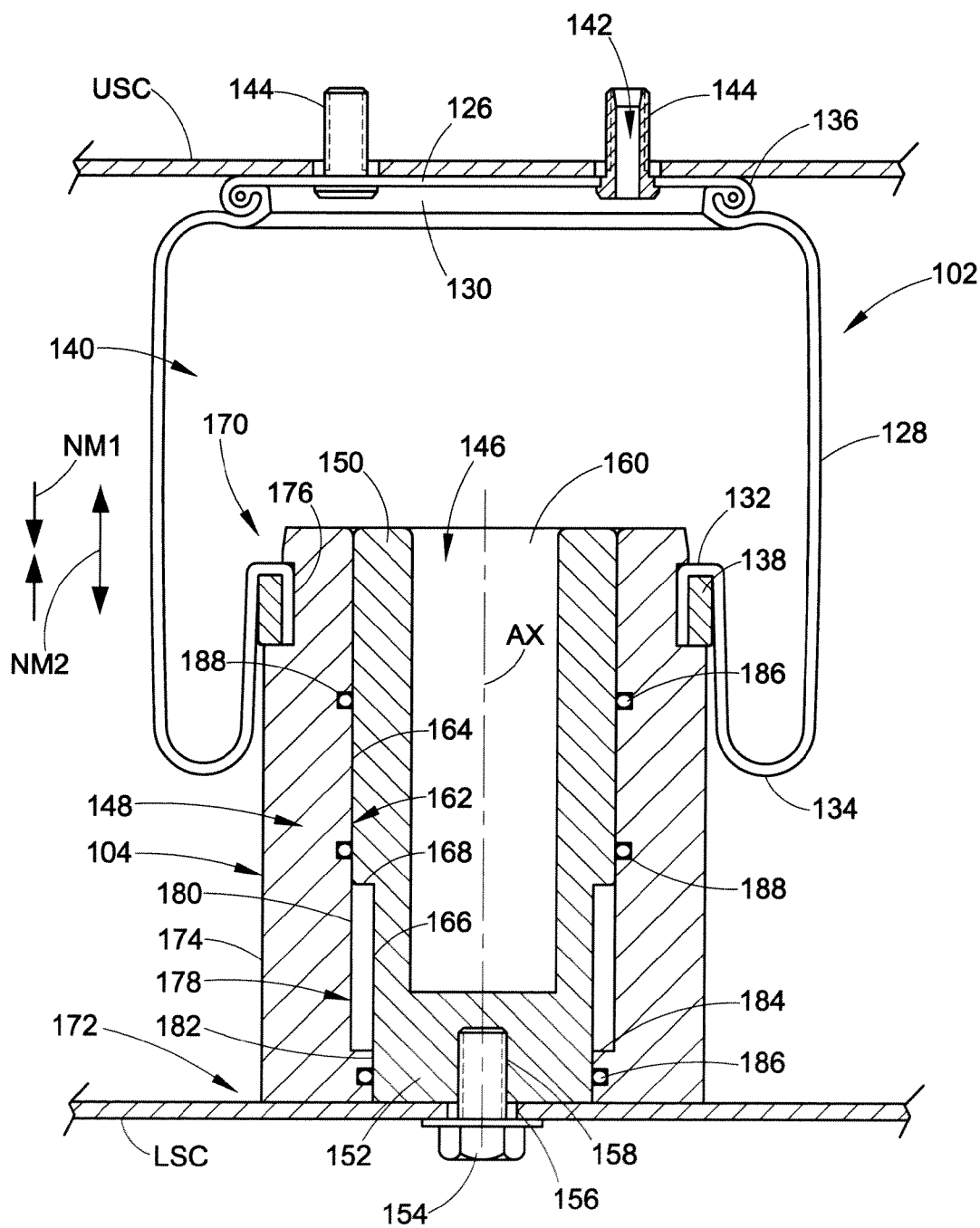
FIG. 2 is a side view of one exemplary embodiment of a gas spring assembly including a piston assembly in accordance with the present novel concept shown in a collapsed condition.
Figure 3:
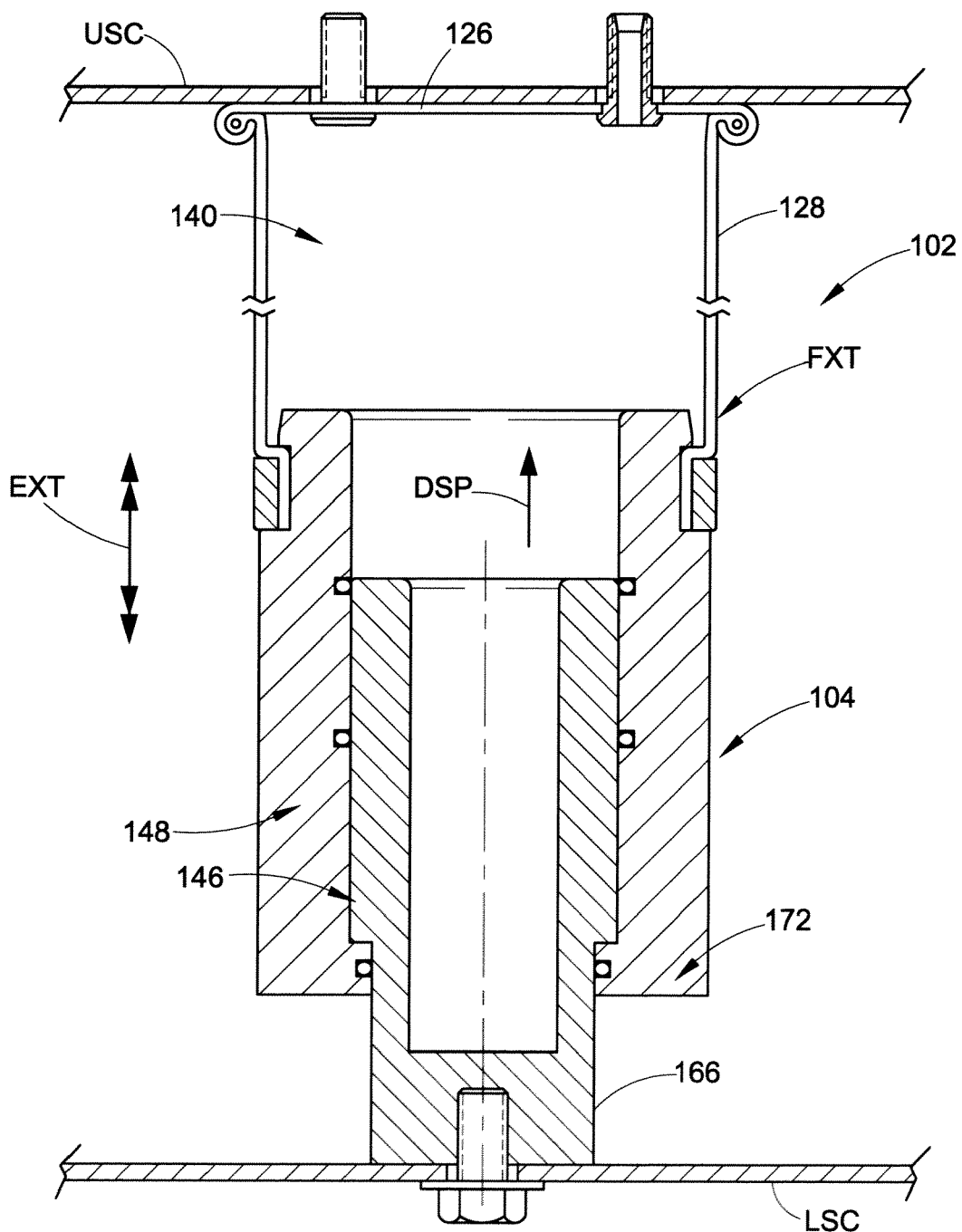
FIG. 3 is a side view of the gas spring assembly in FIG. 2 shown with the piston assembly thereof in an extended condition.

Turning now to FIGS. 2 and 3, air spring assembly 102 is shown supported between an upper structural component USC and an opposing lower structural component LSC, which components are merely representative of structural components of any suitable type, kind and/or configuration, such as body BDY and wheel-engaging member WEM of vehicle VHC in FIG. 1, for example.

Gas spring assembly 102 includes a central axis AX, a first end member, such as a first bead plate 126, for example, and a second end member, such as piston assembly 104, for example, that is spaced from the first end member. A flexible wall 128 extends between the first and second end members and includes opposing open ends 130 and 132. As a preferred arrangement, flexible wall 128 is shown and described herein as being of an elongated sleeve-type configuration that is capable of forming a rolling lobe 134 along the exterior of an end member, such as piston assembly 104, for example. However, it will be appreciated that other constructions could alternately be used.

Flexible wall 128 can be secured between the first and second end members in any suitable manner. For example, open end 130 is shown as being connected along bead plate 126 using a roll-crimped arrangement 136 to form a substantially fluid-tight seal between the end member and the flexible wall. As another example, open end 132 is shown as being connected on piston assembly 104 using a retaining ring 138 that is radially inwardly deformed to compressively secure the flexible wall on the end member. Flexible wall 128 at least partially defines a spring chamber 140 formed generally between the first and second end members. Pressurized gas can be communicated into and out of spring chamber 140 in any suitable manner, such as, for example, through a passage 142 formed through one of mounting studs 144 used for securing the first end member on an associated structural component, such as upper structural component USC, for example.

The exemplary embodiment of piston assembly 104 shown in FIGS. 2 and 3 includes first and second piston members 146 and 148. First piston member 146 includes a first or upper end 150 and an opposing second or mounting end 152. Mounting end 152 is disposed along lower structural member and can be secured thereto in any suitable manner. For example, a fastener 154 can extend a passage 156 in lower structural component LSC and engage a cooperable threaded hole 158 formed into mounting end 152 of first piston member 146. A central cavity or opening 160 can optionally be formed into or otherwise provided on first piston member 146, such as for manufacturing purposes or for altering the performance characteristics of the gas spring, for example, and, if provided, can be of any suitable size, shape and/or configuration. Additionally, first piston member 146 includes an outer surface or wall 162 that includes a first outer surface or wall portion 164 and a second outer surface or wall portion 166. First outer surface portion 164 is shown as extending axially from along first end 150 toward mounting end 152 and has a first diameter (not numbered). Second outer surface portion 166 is shown as extending from along mounting end 152 toward first end 150 and has a second diameter (not numbered). As shown in the present exemplary embodiment, it can be observed that the first diameter is at least slightly larger than the second diameter. As such, a shoulder or engagement wall 168 extends approximately transverse to axis AX between first and second outer surface portions 164 and 166.

Second piston member 148 is shown in FIGS. 2 and 3 as including a first or flexible wall-engaging end 170 and an opposing second or lower end 172. An outer side wall or surface 174 is shown as extending generally axially between first and second ends 170 and 172. Though outer side wall 174 is shown as being substantially cylindrical, it will be appreciated that any other suitable size, shape, profile and/or configuration could alternately be used. Flexible wall-engaging end 170 includes a flexible wall-engaging portion 176, which in the exemplary embodiment shown extends along outer side wall 174. It should be appreciated, however, that any other suitable configuration could alternately be used.

Second piston member 148 also includes an inner side wall or surface 178 that also generally extends between first and second ends 170 and 172. Inner side wall 178 is shown in the present exemplary embodiment as including first and second inner side wall or surface portions 180 and 182. First inner surface portion 180 is shown as extending from along first end 170 toward second end 172 and as having a first diameter (not numbered). Second inner surface portion 182 is shown extending from along second end 172 toward first end 170 and as having a second diameter (not numbered). As shown in the present exemplary embodiment, it can be observed that the first diameter is at least slightly larger than the second diameter. As such, a shoulder or engagement wall 184 extends approximately transverse to axis AX between first and second inner surface portions 180 and 182.

In one preferred arrangement, outer side wall 162 of first piston member 146 and inner side wall 178 of second piston member 148 are complimentary to one another, such as by including cooperative sizes and shapes, for example. As such, the first and second piston members are preferably capable of displacement relative to one another. Since at least some space or gap between the inner and outer side walls will likely be provided to permit such displacement, it could be possible for pressurized gas from spring chamber 140 to pass through any such space or gap and thereby result in reduced performance. As such, including optional sealing members, such as sealing rings 186, for example, compressively positioned between portions of inner and outer side walls 178 and 162. Such optional sealing members, if provided, preferably form a substantially fluid-tight seal between the first and second piston sections but still permit relative displacement therebetween. In one exemplary embodiment, sealing rings 186 can be received in suitable ring-receiving grooves 188 which are shown as being formed radially outwardly into second piston member 148. However, it will be recognized that any other suitable arrangement can alternately be used.

As mentioned above, in use it is desirable for first and second piston members 146 and 148 to be axially displaceable relative to one another. Gas spring assembly 102 is shown in FIG. 2 under normal conditions of use under which piston assembly 104 is disposed in, and preferably remains in, a collapsed condition, as the gas spring assembly is displaced through a normal range of movements, such as may be due to the dynamic movements of associated sprung and unsprung masses toward or away from one another, for example, as indicated by arrows NM1 and NM2. As such, one additional benefit of the use of sealing rings 186 or other suitable sealing arrangements could be that the same tend to generate a minor increase in resistance to movement of the piston members relative to one another. As such, piston members 146 and 148 preferably remain in a collapsed condition under normal usage such that any loads applied to the gas spring assembly can be transferred through first and/or second piston members 146 and 148 into lower structural component LSC.

Under increased displacement of the associated sprung and unsprung masses away from one another, however, flexible wall 128 can become fully extended as is indicated in FIG. 3 by reference characters FXT. Any further displacement of the associated sprung and unsprung masses away from one another, as represented by arrow EXT in FIG. 3, could result in damage to the gas spring assembly in any one of a variety of manners. By utilizing a piston assembly in accordance with the present novel concept, such as piston assembly 104, for example, the gas spring assembly can accommodate any such extreme displacement conditions. This occurs by permitting a portion of the piston assembly to move away from the structural component on which the piston assembly is supported. Preferably, the portion of the piston assembly that is permitted to move is the same portion to which the flexible wall is secured. Thus, the effective maximum height of the gas spring assembly is increased.

Turning more specifically to FIG. 3, the extreme displacement of upper and lower structural components USC and LSC is represented by arrow EXT. Flexible wall 128 is also shown in a fully extended condition FXT in which the flexible wall is being tensioned between bead plate 126 and second piston member 148. As the structural components continue to move further apart, second piston member 148 slides or otherwise moves axially relative to first piston member 146, as indicated by arrow DSP, such that second outer surface portion 166 projects outwardly from second end 172 of the second piston member and a gap or space (not numbered) is formed between the second end and the lower structural component. It will be appreciated that the piston assembly can extend any given amount up to a position in which engagement walls 168 and 184 contact one another and thereby provide a positive stop with regard to relative movement of the piston members. Once the extreme displacement condition has abated, second piston member 148 will return to the collapsed condition, such as due to the pressure of the gas within the spring chamber and/or due to an abutting engagement by an opposing component (e.g., bead plate 126), for example.

Figure 4:
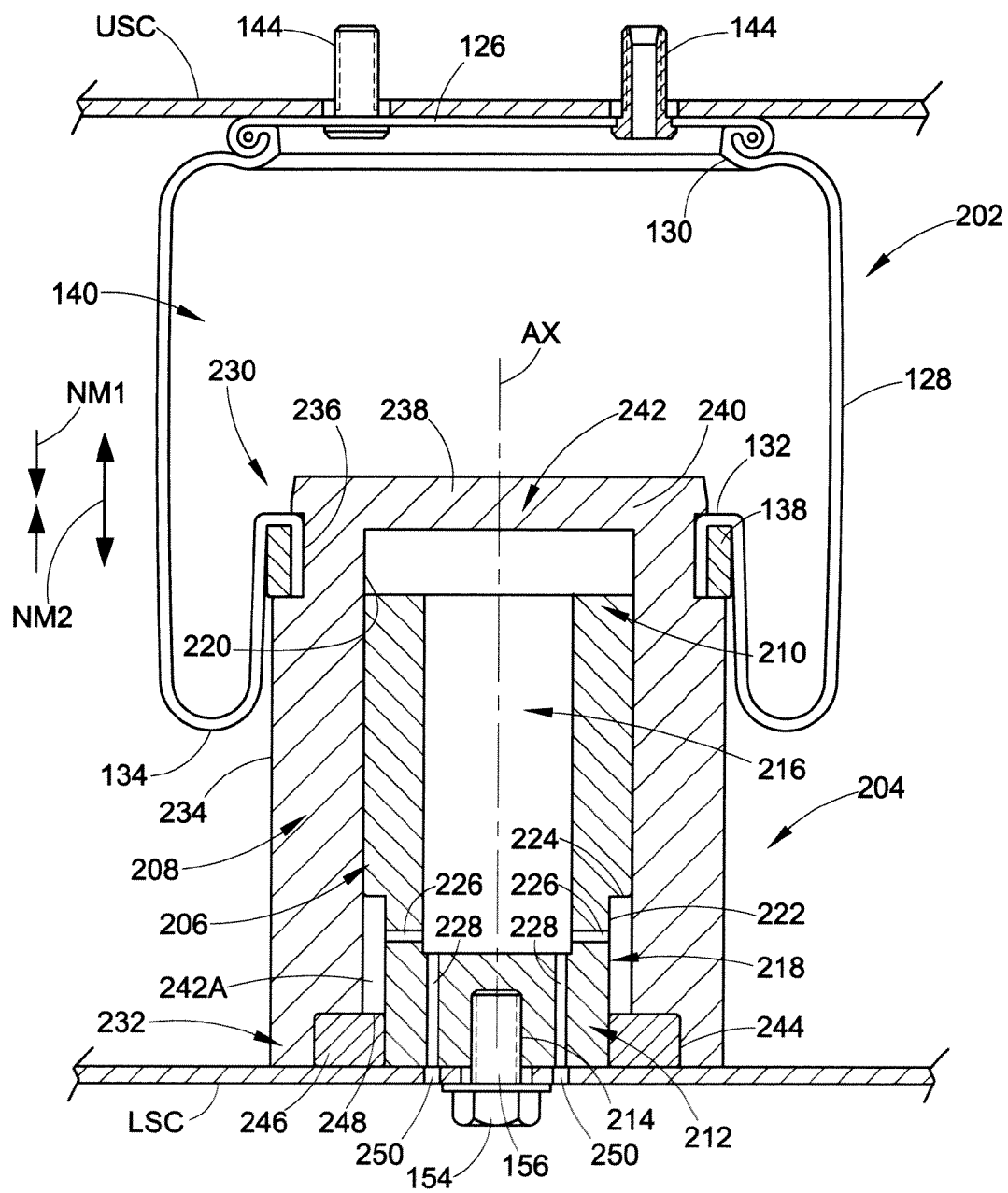
FIG. 4 is a side view of another exemplary embodiment of a gas spring assembly including a piston assembly in accordance with the present novel concept shown in a collapsed condition.
Figure 5:
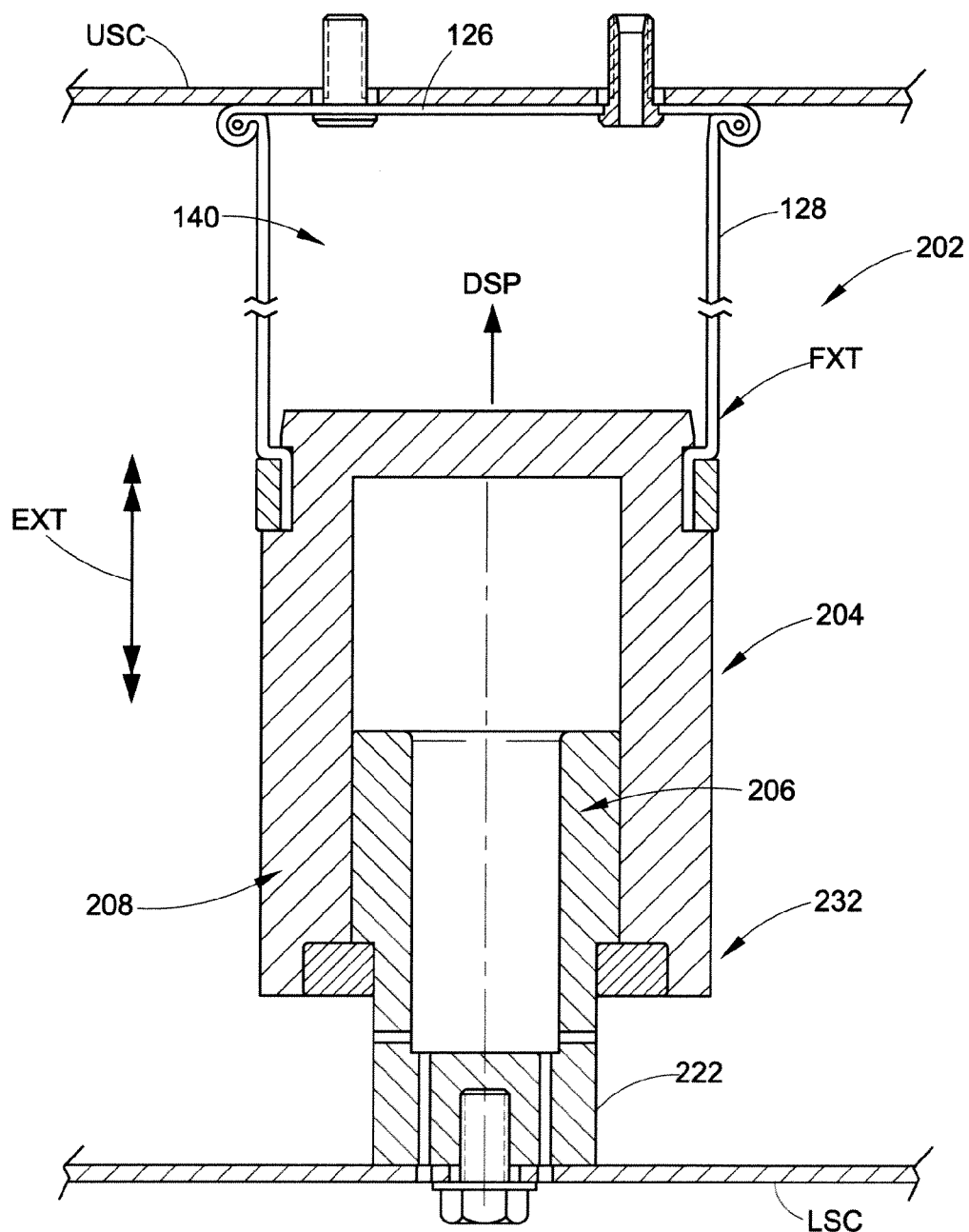
FIG. 5 is a side view of the gas spring assembly in FIG. 4 shown with the piston assembly thereof in an extended condition.

Another exemplary embodiment of a gas spring assembly 202 in accordance with the present novel concept is shown in FIGS. 4 and 5. It will be appreciated that gas spring assembly 202 is substantially similar in construction and operation to gas spring assembly 102 discussed above. Accordingly, like elements and/or features are indicated by like reference numbers and a full discussion of these like element and/or features may not be repeated for this second exemplary embodiment. However, gas spring assembly 202 differs from gas spring assembly 102 in that another exemplary embodiment of a piston assembly 204 is provided in place of piston assembly 104 discussed above. Reference numbers from the above discussion of piston assembly 104 are not maintained in the following discussion of piston assembly 204.

As shown in the exemplary embodiment in FIGS. 4 and 5, piston assembly 204 includes a first piston member 206 and a second piston member 208. First piston member 206 includes a first or upper end 210 and an opposing second or mounting end 212. Mounting end 212 is shown as being disposed along lower structural member LSC and can be secured thereto in any suitable manner, such as by using fastener 154 which can extend through passage 156 in the lower structural component and engage a cooperable threaded hole 214 formed into mounting end 212 of the first piston member. A central cavity or opening 216 can optionally be formed into or otherwise provided on first piston member 206, as discussed above with regard to opening 160.

First piston member 206 also includes an outer surface or wall 218 that includes a first and second outer surface or wall portions 220 and 222. First outer surface portion 220 is shown as extending axially from along first end 210 toward mounting end 212 and has a first diameter (not numbered). Second outer surface portion 222 is shown as extending from along mounting end 212 toward first end 210 and has a second diameter (not numbered). As shown in the present exemplary embodiment, it can be observed that the first diameter is at least slightly larger than the second diameter. As such, a shoulder or engagement wall 224 extends approximately transverse to axis AX between first and second outer surface portions 220 and 222. Additionally, first piston member 206 can optionally include any number of one or more fluid communication passages, such as passages 226 and 228, for example. It will be appreciated any such fluid communication passages, if provided, can be of any suitable type, kind and/or configuration.

Second piston member 208 is shown in FIGS. 4 and 5 as including a first or flexible wall-engaging end 230 and an opposing second or lower end 232. An outer side wall or surface 234 is shown as extending generally axially between first and second ends 230 and 232. Though outer side wall 234 is shown as extending generally axially between first and second ends 230 and 232, it will be appreciated that any other suitable size, shape, profile and/or configuration could alternately be used. Additionally, flexible wall-engaging end 230 includes a flexible wall-engaging portion 236, which in the exemplary embodiment shown extends along outer side wall 234. However it will be appreciated that any other suitable configuration could alternately be used. Furthermore, second piston member 208 differs from second piston 108 in that the former includes an end wall 238 disposed along first end 230.

Second piston member 208 also includes an inner side wall 240 that generally extends axially between first and second ends 230 and 232 and thereby forms an inner chamber or cavity 242 within the second piston member. The inner chamber has a closed end (not numbered) that is generally formed by end wall 238 and an opposing open end (not numbered) formed along second end 232 of the second piston member. Additionally, second piston member 208 includes a recess 244 formed thereinto along second end 232. To prevent second piston member 208 from inadvertently disassociated with first piston member 206, such as by axially displacing the second end member a distance sufficient to extend second end 232 beyond first end 210, for example, a retaining member can be received into recess 244 to at least partially modify the size and/or shape of the open end of cavity 242. As shown in FIGS. 4 and 5, an annular retaining ring 246 is received in recess 244 and includes an end wall having an engagement portion 248 extending radially inwardly into the open end.

It will be recognized that central cavity 216 and inner chamber 242 are in communication with one another and, under typical conditions of usage, contain a quantity or volume of gas. Additionally, to permit displacement of the first and second piston members 206 and 208 in a direction axially away from one another, engagement wall 224 and engagement portion 248 of retaining ring 246 should be spaced from one another. As such, this portion 242A of inner chamber 242 will normally include an additional quantity or volume of gas. During relative movement of the piston members axially away from one another, engagement wall 224 and engagement portion 248 will move toward one another until abuttingly engaging one another as shown in FIG. 5. During such movement, the gas in portion 242A of inner chamber 242 can be transferred through passages 226 to prevent buildup of pressure within portion 242A. Additionally, during movement of the piston members relative to one another in either axial direction, gas can be communicated to and from the central cavity and inner chamber through passages 228 to prevent or at least minimize the generation of gas pressure differentials. To permit the gas to be communicated to an external atmosphere or environment, openings 250 can be provided in lower structural member LSC or any other associated structural component.

One benefit of piston assembly 104, which is shown in and discussed with regard to FIGS. 2 and 3, is that first piston member 146 can simply be fitted into second piston member 148. It will be appreciated that by then securing piston assembly 104 on an associated structural component, the piston assembly is maintained in a fully assembled condition and the installation and use of other components to retain the members in an assembled condition is avoided. However, one benefit of piston assembly 204 is that spring chamber 140 is fluidically isolated from inner chamber 242. As such, the use of one or more sealing members to form a substantially fluid-tight seal between the piston members can be avoided.

As used herein with reference to certain elements, components and/or structures (e.g., "first end member" and "second end member"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring assembly comprising:
an end member;
a piston assembly disposed in spaced relation to said end member such that an axis is defined therebetween, said piston assembly including a first piston member and a second piston member slidably interengaging one another and being freely displaceable relative to one another between a collapsed condition and an extended condition, said first piston member including a first proximal end disposed toward said end member and a first distal end spaced from said first proximal end in a direction axially-opposite said end member, said second piston member including a second proximal end disposed toward said end member, a second distal end spaced from said second proximal end in a direction axially-opposite said end member, an outer side wall portion and a flexible wall-engaging portion; and,
a flexible wall secured between said end member and said piston assembly and at least partially defining a spring chamber therebetween, said flexible wall secured on said flexible wall-engaging portion of said second piston member;
said gas spring assembly operable in a first condition in which:
a1) said flexible wall is disposed along said outer side wall portion of said second piston member such that a rolling lobe is formed along said flexible wall for movement along said outer side wall portion; and,
a2) said piston assembly is in said collapsed condition such that said flexible wall-engaging portion of said second piston member is axially spaced a first distance from said first distal end of said first piston member; and, said gas spring assembly operable in a second condition in which:
- b1) said flexible wall is tensioned between said end member and said second piston member such that said flexible wall extends away from said second piston member; and,
- b2) said piston assembly is drawn into said extended condition due to said tension between said end member and said second piston member such that said flexible wall-engaging portion is axially spaced a second distance from said first distal end of said first piston member with said second distance being greater than said first distance.

2. A gas spring assembly according to claim 1, wherein one of said first and second piston members includes an inner chamber that at least partially receives the other of said first and second piston members.

3. A gas spring assembly according to claim 2, wherein said second piston member includes said inner chamber and said first piston member is at least partially received within said inner chamber of said second piston member, said second piston member including at least one open end through which at least said first distal end of said first piston member extends.

4. A gas spring assembly according to claim 3, wherein said first piston member includes an approximately axially-extending outer wall and an approximately transversely-extending first engagement wall projecting from along said outer wall, said second piston member includes an approximately axially-extending inner wall that at least partially defines said inner chamber and an approximately transversely-extending second engagement wall projecting inwardly from along said inner wall, said outer wall disposed adjacent said inner wall and spaced radially inwardly therefrom, and said first and second engagement walls interengage one another in said extended condition thereby preventing further axial displacement of said first and second piston members.

5. A gas spring assembly according to claim 4, wherein said inner chamber includes opposing open ends such that at least a portion of said first piston member is in fluid communication with said spring chamber, said piston assembly including a sealing member compressively disposed between said first and second piston members and forming a substantially fluid-tight seal therebetween.

6. A gas spring assembly according to claim 1, wherein said flexible wall-engaging portion is disposed along said second proximal end of said second piston member.

7. A gas spring assembly according to claim 1, wherein said flexible wall includes an open end secured on said flexible wall-engaging portion and forming a substantially fluid-tight seal therewith.

8. A suspension system for an associated vehicle, said suspension system comprising:
- a plurality of gas spring assemblies with at least one gas spring assembly thereof having a longitudinally extending axis and including an end member, a piston assembly axially spaced from said end member, and a flexible wall secured between said end member and said piston assembly that at least partially defines a spring chamber therebetween, said piston assembly including:
  - first and second piston members slidably interengaging one another and freely displaceable relative to one another in opposing axial directions between a collapsed condition and an extended condition;
  - said first piston member including a first proximal end disposed toward said end member and a first distal end spaced from said first proximal end in a direction axially-opposite said end member;
  - said second piston member including a flexible wall-engaging portion that forms a connection with said flexible wall, an outer side wall portion abuttingly engaging a rolling-lobe formed along said flexible wall, a second proximal end disposed toward said end member and a second distal end spaced from said second proximal end in a direction axially-opposite said end member;
- a pressurized gas source in communication with said plurality of gas spring assemblies;
- a control device operatively connected between said pressurized gas source and said plurality of gas spring assemblies and adapted to selectively permit pressurized gas flow therebetween; and,
- an electronic control unit in communication with at least said control device and capable of actuating said control device to selectively permit pressurized gas flow to and from said plurality of gas spring assemblies;
- said at least one gas spring assembly operable in a first condition in which:
  - a1) said flexible wall is disposed along said outer side wall portion of said second piston member such that said rolling lobe is formed therealong; and,
  - a2) said piston assembly is in said collapsed condition such that said second proximal end of said second piston member is axially spaced a first distance from said first distal end of said first piston member; and,
- said at least one gas spring assembly operable in a second condition in which:
  - b1) said flexible wall is tensioned between said end member and said second piston member such that said flexible wall is pulled away from said second piston member under such tension; and,
  - b2) said piston assembly is in said extended condition due to said tension between said end member and said second piston member such that said second proximal end is axially spaced a second distance from said first distal end of said first piston member with said second distance being greater than said first distance.

9. A suspension system according to claim 8, wherein said end member and said first distal end of said first piston member are spaced a distance from one another that falls within a first distance range in said first condition and with said distance exceeding said first distance range in said second condition.

10. A suspension system according to claim 8 further comprising a sealing member operatively disposed between said first and second piston members and forming a substantially fluid-tight seal therebetween that permits sliding motion between said first and second piston members.

11. A suspension system according to claim 8, wherein said second piston member includes an inner chamber and said first piston member is at least partially received within said inner chamber of said second piston member, said second piston member including at least one open end through which at least said mounting end of said first piston member extends.

12. A suspension system according to claim 8 further comprising first and second vehicle structural components disposed in axially-spaced relation to one another, said at least one gas spring assembly being disposed between said first and second vehicle structural components such that said end member is disposed in abutting engagement along said first vehicle structural component and said piston assembly is disposed in abutting engagement along said second vehicle structural component.

13. A suspension system according to claim 12, wherein said end member is secured to said first vehicle structural component.

14. A suspension system according to claim 12, wherein said first distal end of said first piston member is secured in abutting engagement on said second vehicle structural component.

15. A method of operating a gas spring assembly, said method comprising:
- a) providing a gas spring assembly having an axis and including an end member, a piston assembly axially spaced from said end member, and a flexible wall extending between said end member and said piston assembly, said piston assembly including first and second piston members that extensibly interengage one another and are freely displaceable relative to one another in opposing axial directions between a collapsed condition and an extended condition;
  - a1) said first piston member including a first proximal end disposed toward said end member and a first distal end spaced from said first proximal end in a direction axially-opposite said end member;
  - a2) said second piston member including a second proximal end disposed toward said end member, a second distal end spaced from said second proximal end in a direction axially-opposite said end member, an outer side wall portion abuttingly engaging a rolling-lobe formed along said flexible wall, and a flexible wall-engaging portion that at least partially forms a connection with said flexible wall;
- b) operating said gas spring assembly in a first condition in which:
  - b1) said flexible wall is disposed along said outer side wall portion of said second piston member such that said rolling lobe is displaced therealong; and,
  - b2) said piston assembly is in said collapsed condition such that said second proximal end of said second piston member is axially spaced a first distance from said first distal end of said first piston member; and,
- c) operating said gas spring assembly in a second condition in which:
  - c1) said flexible wall is drawn into tension between said end member and said second piston member such that said flexible wall is pulled away from said second piston member and said rolling lobe is unformed; and,
  - c2) said piston assembly is pulled into said extended condition under said tension between said end member and said second piston member such that said second proximal end of said second piston member is axially spaced a second distance from said first distal end of said first piston member with said second distance being greater than said first distance.

16. A method according to claim 15, wherein said first piston member includes a first engagement wall extending generally transverse to said axis and said second piston member includes a second engagement wall extending generally transverse to said axis, and pulling said piston assembly into said extended condition in c2) includes engaging said first and second engagement walls and thereby preventing further extension of said first and second piston members.

17. A method according to claim 15, wherein said second piston member includes an axially-extending inner wall at least partially defining an inner cavity having at least one open end, said first piston member includes an axially-extending outer wall at least partially received within said inner cavity, and said method further comprises forming a substantially fluid-tight seal between said first and second piston members such that said substantially fluid-tight seal is maintained between said first and second piston members during operation of said gas spring assembly in said first and second conditions.

18. A method according to claim 15 further comprising:
providing a vehicle having an unsprung mass and a sprung mass supported on said unsprung mass;
securing said gas spring assembly between said sprung and unsprung masses of said vehicle such that said end member is operatively connected on one of said sprung and unsprung masses and such that said first distal end of said first piston member is secured on the other of said sprung and unsprung masses.

19. A method according to claim 18, wherein operating said gas spring assembly in said second condition in c) includes displacing said sprung and unsprung masses in a direction generally away from one another a distance sufficient to draw said flexible wall into tension and thereby pull said second piston member into said extended condition.

20. A method according to claim 19 further comprising displacing said sprung and unsprung masses generally toward one another and thereby collapsing said piston assembly such that said second proximal end of said second piston member returns to approximately said first distance from said first distal end of said first piston member.

* * * * *

UNITED STATES PATENT AND TRADEMARK OFFICE
CERTIFICATE OF CORRECTION

PATENT NO. : 7,497,423 B2  Page 1 of 1
APPLICATION NO. : 11/654328
DATED : March 3, 2009
INVENTOR(S) : James Richard Myers It is certified that error appears in the above-identified patent and that said Letters Patent is hereby corrected as shown below:

Column 14, Claim 20, line 43, by deleting the words "second proximal end of said second piston member returns to approximately said first distance from said first distal end of said first piston member" and inserting --flexible wall-engaging end of said second piston member is axially disposed at a second distance from said mounting end of said first piston member with said first distance being greater than said second distance.--

Signed and Sealed this

Thirtieth Day of June, 2009

JOHN DOLL
*Acting Director of the United States Patent and Trademark Office*